United States Patent [19]

Holroyd et al.

[11] Patent Number: 5,114,512
[45] Date of Patent: May 19, 1992

[54] BEAD FILLER CONSTRUCTION

[75] Inventors: Eric Holroyd, Knutsford; Anthony R. Wright, Southport, both of England

[73] Assignee: Bridgestone/Firestone Inc., Akron, Ohio

[21] Appl. No.: 474,129
[22] PCT Filed: Nov. 14, 1988
[86] PCT No.: PCT/GB88/00985
§ 371 Date: May 1, 1990
§ 102(e) Date: May 1, 1990
[87] PCT Pub. No.: WO89/04250
PCT Pub. Date: May 18, 1989

[30] Foreign Application Priority Data

Nov. 13, 1987 [GB] United Kingdom ............... 8726628

[51] Int. Cl.$^5$ ..................... B60C 15/04; B29D 30/48
[52] U.S. Cl. ..................................... 156/135; 152/541
[58] Field of Search ................. 156/110.1, 117, 130.3, 156/130.7, 131, 132, 136, 135, 137, 141, 143, 398, 400, 403, 422, 460; 152/539, 540, 541, 544, 546, 547; 428/295, 302; 245/1.5

[56] References Cited

U.S. PATENT DOCUMENTS

| 1,174,238 | 3/1916 | Douse | 152/541 |
|---|---|---|---|
| 1,406,555 | 2/1922 | Hahn. | |
| 1,482,240 | 1/1924 | Marquette | 152/541 |
| 3,935,894 | 2/1976 | Pouilloux | 152/540 |
| 4,963,207 | 10/1990 | Laurent | 156/117 |
| 4,983,239 | 1/1991 | Holroyd et al. | 156/123 |

Primary Examiner—Michael W. Ball
Attorney, Agent, or Firm—Sughrue, Mion, Zinn, Macpeak & Seas

[57] ABSTRACT

In the manufacture of a pneumatic tire the approximately triangular space immediately radially inward of each bead of the tire is filled by an apex construction made by helically winding uncured rubber strip. The tapered configuration is achieved by winding from a position progressively closer to a support surface so that the windings become progressively more oblique. Width reduction of the rubber strip can be achieved by subjecting it to progresively greater tension during winding. The winding of the apex formation may be interrupted while an end of a carcass play is turned over the bead and incomplete apex. Turns of unsheathed wire may be wound over the carcass ply end and then winding of the uncured rubber strip continued until the apex formation is completed. In one modification (FIG. 5) the carcass ply is incorporated in a wound bead assembly. In another (FIG. 3) windings of a harder material such as Kevlar are interposed between windings of uncured rubber.

9 Claims, 1 Drawing Sheet

BEAD FILLER CONSTRUCTION

This invention relates to a bead filler construction, and more particularly to the construction of the component of a pneumatic tire known as the "apex" which fills the approximately triangular space on the radially outer side of each bead portion of the tire.

As described in our co-pending International Patent Application No. PCT/GB 88/00984 published under the Ser. No. WO 89/04259 on May 18th, 1989, in the manufacture of a pneumatic tire a carcass ply of cord-reinforced polymeric material is wrapped around a cylindrical former, annular bead formations comprising an inextensible material such as wire are wound over the tubular carcass ply near its ends, the end portions of the ply are turned up over the bead formations, the ply is given a toroidal shape by inflation of the central portion of the former between the beads and subsequently other components of the tire such as the breaker, tread and sidewalls are added prior to curing the completed assembly in a mould.

If a carcass ply is wrapped over a bead formation e.g. of rectangular cross-section there will evidently be a space approximately of triangular cross-section on the radially outer side of the bead where the carcass ply and sidewall diverge around the bead. It is essential for the stability of a pneumatic tire that this space is filled, and preferably reinforced, by a so-called "apex" component.

Prior to this invention apex components have been provided by cutting to length extrusions of approximately triangular cross-section of rubber or other polymeric material and winding the cut lengths over the bead formations. A principal object of the present invention is to improve upon such techniques.

In accordance with one of its aspects the present invention provides a method of constructing a bead filler or apex in the production of a pneumatic tire, the method comprising helically winding one or more flat strips of polymeric material over the radially outer side of a bead so as to produce an approximately triangular formation of superimposed turns tapering radially outwardly of the bead.

The winding is preferably effected adjacent a flat surface which lies in a place which is generally radial with respect to a former on which the tire is being constructed and from a position displaced toward said flat surface such that successive windings adopt a progressively more oblique orientation in the direction radially outward with respect to the bead being wound upon, thereby contributing to the taper of the finished apex.

The or at least one said strip may be subjected during winding to differential tension so as to reduce its width.

Windings of a relatively harder material such as Kevlar may be alternated with windings of uncured rubber during the formation of the apex.

At least one said strip may be a continuation into the apex region of a strip wound to form the bead in the method of bead construction described in our said co-pending International Patent Application Ser. No. WO 89/04259.

Turns of naked wire may be interposed between turns of uncured rubber. The wire turns may be adjacent said flat surface. Alternatively, or in addition, during the formation of the apex a carcass ply edge may be folded over the incomplete apex and a slit formed therein to permit the continued winding of the apex whereby said edge is incorporated in and locked to the apex formation. In this case a layer of wire windings may be laid over the folded back ply edge within the apex formation and beneath subsequent polymeric windings.

BRIEF DESCRIPTION OF THE DRAWINGS

Embodiments of the present invention will now be described by way of example with reference to the accompanying diagrammatic drawings, in which.

DETAILED DESCRIPTION

Figure 1:
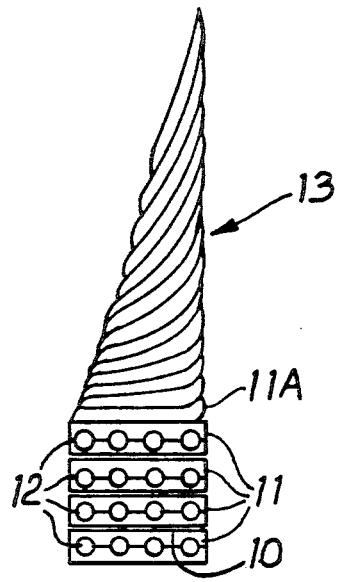
FIGS. 1-5 each are similar cross-sectional views in radial planes through bead and filler or apex assemblies in accordance with the invention.

FIG. 1 illustrates a bead 10 generally of rectangular cross-section which has been built as described with reference to FIG. 1 of the drawings of our said co-pending International Patent Application Ser. No. WO 89/04259, i.e. by superimposing on a ply carcass (not shown) wrapped around a tire former (not shown) alternate helical windings 11 of a flat strip of uncured rubber and layers 12 each comprising spaced-apart turns of naked (i.e. unsheathed) wire.

In accordance with this embodiment of the present invention the winding of the uncured rubber strip does not terminate with the formation of the bead assembly 10 but is continued to produce an apex assembly 13 superimposed on, integral with and extending radially outwardly of the bead assembly 10. As shown in FIG. 1 the windings making up the apex 13 differ from those making up the bead 10 in that no wire is alternated between successive turns of uncured rubber, but the position from which the winding takes place is progressively displaced to the right as viewed toward a flat abutment surface (not shown), radial with respect to the former. The effect of this arrangement is that, as shown, successive turns of the rubber strip making up the apex formation 13 adopt a progressively greater inclination relative to the axis of the former. It will also be noted that successive turns making up the apex formation 13 become progressively narrower in the direction radially outward with respect to the bead upon which it is being wound. This can of course be achieved by using a strip which progressively reduces in width but alternatively a strip of substantially constant thickness may be subjected to progressively greater tension during winding so as to reduce its section.

The apex formation 13, in common with the bead formation 10, retains its shape through the self-adhesion of the uncured rubber windings during subsequent tire building procedures and is eventually solidified and integrated when the tire assembly is placed in a mould to vulcanise the rubber.

Figure 2:
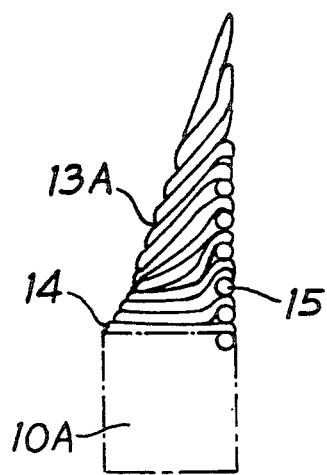

The modification shown in FIG. 2 differs in two respects. Firstly the bead formation 10A is of a kind known per se so that the first helical winding 14 of uncured rubber strip making up the apex formation 13A is not a continuation of a winding of the bead 10A. Secondly the apex formation 13A is reinforced by a spiral winding 15 of naked (i.e. unsheathed) wire which is laid against the support surface with turns of uncured rubber interposed between the turns of wire. In the finished tire the turns of wire 15 are surrounded by and embedded in the vulcanised rubber of the apex formation 13A and of the carcass ply which has been deformed upward alongside the right-hand side of the apex assembly 13A, as viewed, during manufacture of the tire.

Figure 3:
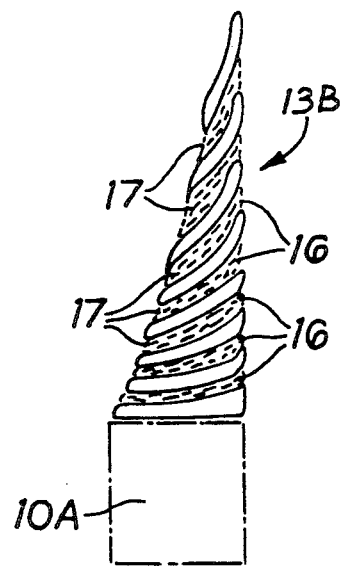

The modification of FIG. 3 differes from that of FIG. 2 in that wire is dispensed with but in the apex formation 13B windings 16 of a less extensible reinforcing material are interposed between the windings 17 of uncured rubber.

Figure 4:
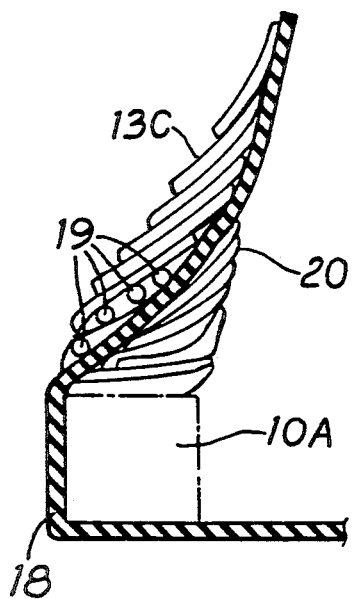

In the modification shown in FIG. 4 the winding of uncured rubber strip to form the apex formation 13C has been interrupted while the end portion of a carcass ply 18 has been turned up over the bead 10A and the unfinished apex assembly. Spaced windings 19 of naked (i.e. unsheathed) wire are now helically wound over the turned-over ply end locking it in place and reinforcing the finished apex assembly. After application of the wire turns 19 winding of uncured rubber strip is continued over the turned-over ply end and the wire 19 until an apex assembly or apex chafer 13C of the desired configuration is achieved. When subsequently the rubber is vulcanised the ply material as well as the wire is integrated with and embedded in the rubber of the apex formation.

Figure 5:
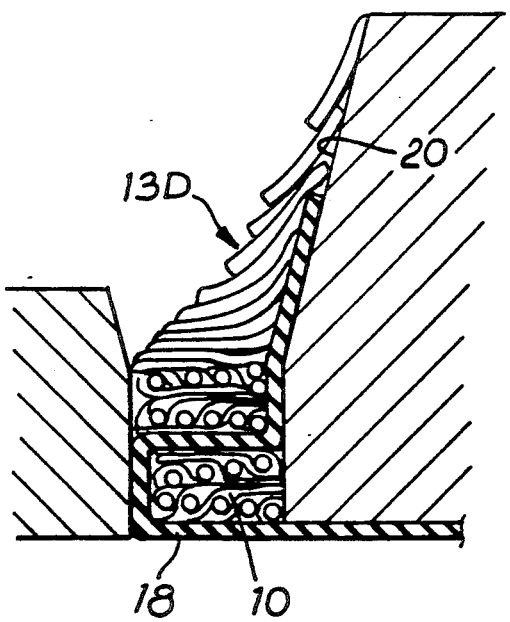

In the modification of FIG. 5 the bead formation 10 is again of the kind constructed in accordance with our said co-pending United Kingdom Patent Application of even date entitled "Bead reinforcement construction". During the winding of substantially parallel, alternate layers of uncured rubber and bare wire the winding process is interrupted while the end portion of a carcass ply 18 is turned over the incomplete bead formation 10 and then laid against a support surface 20. The winding of the bead formation 10 is then recommenced followed immediately by that of the apex formation 13D, uncured rubber strip of the apex formation being the same as that included in the bead formation, until an apex formation 13D is completed which tapers beyond the terminal edge of the carcass ply 18. Subsequently the support surface 20 is removed and, in known manner, the carcass ply 18 is deformed in its central region into a toroidal configuration so that it is contiguous with the right-hand side, as viewed, of the bead and apex assembly. The subsequent curing of the rubber both of the ply and of the bead and apex assembly produces an integrated structure in which the turned-up edge of the carcass ply 18 is securely anchored.

We claim:

1. In the production of a pneumatic tire by applying a carcass ply to a former, wrapping discrete annular bead formations around the ply at spaced apart locations, expanding the ply between the bead formations to a substantially toroidal shape and turning up the ply around the bead formations, a method of constructing a bead filler or apex, comprising helically winding one or more flat strips of polymeric material over the radially outer side of a said bead so as to produce an approximately triangular formation of superimposed turns tapering radially outwardly of the bead shaped wholly to fill the space between shaped and turned up regions of the ply on the radially outer side of said bead.

2. A method as claimed in claim 1, wherein the winding is carried out adjacent a flat surface which is generally radial with respect to a former on which the tire is being constructed and said winding is from a position displaced toward said flat surface such that successive windings adopt a progressively more oblique orientation in the direction radially outward with respect to the bead, thereby contributing to the taper of the finished apex.

3. A method as claimed in claim 2, wherein wire windings of uncoated wire are interposed between windings of uncured rubber and are adjacent said flat surface.

4. A method as claimed in claim 1, wherein at least one of said strips is subjected during winding to differential tension so as to reduce its width.

5. A method as claimed in claim 1, wherein windings of a relatively harder material alternate with windings of uncured rubber during the formation of the apex.

6. A method as claimed in claim 1, wherein at least one of said strips is a continuation into the apex region of a strip wound to form the bead.

7. A method as claimed in claim 1, wherein windings of unsheathed wire are interposed between windings of uncured rubber.

8. A method as claimed in claim 1, wherein during the formation of the apex a carcass ply edge is folded over the incomplete apex and a slit is formed therein to permit the continued winding of the apex whereby said edge is incorporated in and locked to the apex formation.

9. A method as claimed in claim 8 wherein a layer of wire windings is laid over the folded back ply edge within the apex formation and beneath subsequent polymeric windings.

* * * * *